United States Patent [19]

Kawata et al.

[11] Patent Number: 4,870,573
[45] Date of Patent: Sep. 26, 1989

[54] MICROCOMPUTER CAPABLE OF TESTING EXECUTION OF A PROGRAM WITH NO BRANCH

[75] Inventors: Kazuhide Kawata; Hiroyuki Suzuki, both of Tokyo, Japan

[73] Assignee: NEC Corporation, Tokyo, Japan

[21] Appl. No.: 847,742

[22] Filed: Apr. 3, 1986

[30] Foreign Application Priority Data

Apr. 3, 1985 [JP] Japan .................. 60-70224

[51] Int. Cl.⁴ .......................... G06F 9/26; G06F 9/32
[52] U.S. Cl. ............................. 364/200; 364/261.3; 364/261.5
[58] Field of Search ...... 364/200 M.S. File, 900 M.S. File

[56] References Cited

U.S. PATENT DOCUMENTS

| | | | |
|---|---|---|---|
| 3,713,108 | 1/1973 | Edstrom et al. | 364/200 |
| 4,042,972 | 8/1977 | Gruner et al. | 364/200 |
| 4,057,850 | 11/1977 | Kaneda et al. | 364/200 |
| 4,091,445 | 5/1978 | Ryan | 364/200 |
| 4,156,900 | 5/1979 | Gruno et al. | 364/200 |
| 4,179,737 | 12/1979 | Kim | 364/200 |
| 4,181,942 | 1/1980 | Forster et al. | 364/200 |
| 4,224,668 | 9/1980 | Peters et al. | 364/200 |
| 4,287,559 | 9/1981 | Easley et al. | 364/200 |
| 4,338,661 | 7/1982 | Tredennick et al. | 364/200 |
| 4,451,885 | 5/1984 | Gerson et al. | 364/200 |
| 4,636,943 | 1/1987 | Horst et al. | 364/200 |

Primary Examiner—Felix D. Gruber
Attorney, Agent, or Firm—Foley & Lardner, Schwartz, Jeffery, Schwaab, Mack, Blumenthal & Evans

[57] ABSTRACT

A semiconductor includes a read only memory associated with an instruction decoder for decoding the instructions read out from the read only memory, and adapted to generate an address load signal when a branch instruction is read out. A program counter is provided to supply the read only memory with the address of a memory location to be read out. This program counter is adapted to be ordinarily incremented at each read-out of the read only memory and to be loaded with the branch address of the read only memory when a branch address load signal is outputted from the instruction decoder. There is also provided a circuit in response to a test mode signal for generating a branch inhibiting signal. A gate is connected to receive the branch inhibiting signal and the branch address load signal, respectively. An output of the gate is connected to an address load control input of the program counter. Thus, in the test mode, even if the branch instruction is read out, the branch instruction is blocked so that the programs in the read only memory are sequentially executed in the order of addresses without branch.

10 Claims, 2 Drawing Sheets

MICROCOMPUTER CAPABLE OF TESTING EXECUTION OF A PROGRAM WITH NO BRANCH

BACKGROUND OF THE INVENTION

1. Field of the Invention

The present invention relates to a microcomputer having a memory stored with a program beforehand, prepared at a user site, and more specifically to such a microcomputer where the test of an operation in accordance with programs stored in the memory can be performed.

2. Description of the related art

Up to this time, two types of tests are performed after microcomputers, having an internal read only memory (hereinafter abbreviated ROM) have finished or completed specific functions. Specifically, in a function test, the microcomputer is set in a test mode, and instructions are inputted from an external to an input port of the microcomputer, so that the output of the computer is compared with an expected value previously prepared. On the other hand, in a ROM content confirmation test, information is read out through an output port of the microcomputer from the ROM storing a program previously prepared at a user site (called "user's program" hereinafter), and the information thus read out is compared with an expected value which has previously been prepared on the basis of the user's program.

In the above mentioned function test, the external input instructions are prepared by microcomputer producers, and therefore, the sequences of instructions are inevitably limited in variety. Accordingly, a perfect function test cannot be expected. To the contrary, the user's program which are stored in ROMs have an indefinite variety. However, the ROM content confirmation test can examine only whether the user's program is properly stored in the ROM, and cannot confirm whether the microcomputer can properly operate on the basis of the user's program stored in the ROM. Because of this, although microcomputers have been regarded as being good from the result of the tests performed by the producer, when the microcomputers were actually assembled in systems or apparatus at the user side, the microcomputers often did not properly operate due to defects attributable to the combination of instructions.

SUMMARY OF THE INVENTION

Accordingly, it is an object of the present invention to provide a microcomputer which has an internal memory and which is adapted such that there can be an examination as to whether the microcomputer will properly operate on the basis of the user's program stored in the internal memory.

Another object of the present invention is to provide a microcomputer which has an internal memory and which is adapted to sequentially execute the program stored in the memory in the order of addresses, without being actually assembled in an apparatus or system.

The above and other ojbects of the present invention are achieved in accordance with the present invention by a microcomputer having a memory for storing a user's program which has a unit for inhibiting execution of a branch instruction read out from the memory at the time of a test, so that the instructions stored in the memory are sequentially executed in the order of addresses.

Specifically, the memory is associated with a program counter for designating the address of a memory location to be read out, and the inhibiting unit includes a first unit for detecting a branch instruction from the output of the memory, and second unit receiving a test mode signal and operative for preventing the program counter from being loaded with a branch address. More specifically, the first unit is an instruction decoder for decoding instructions read out of the memory.

In accordance with another aspect of the present invention, there is provided a microcomputer which includes a central processing unit, a memory having at least a read only memory for storing a user's program, and an input/output port. The microcomputer comprises means for inhibiting execution of a branch instruction read out from read only memory at the time of a test, so that all the instructions stored in the read only memory, except for a branch instruction or instructions, are sequentially executed in the order of addresses by the central processing unit and the result of the sequential execution is outputted from the input/output port of an output port.

Preferably, the read only memory is associated with an instruction decoder for decoding the instructions read out from the read only memory, and a program counter for supplying the read only memory with the address of a memory location to be read out. The program counter is adapted to be ordinarily incremented at each read-out of the read only memory and to be loaded with the branch address of the read only memory in response to a branch address load signal generated when the branch instruction is decoded by the instruction decoder. The above mentioned inhibiting unit includes a first unit for generating a branch inhibiting signal in response to a test mode signal, and second unit for preventing the branch address load signal from being inputted to the program counter in response to the branch inhibiting signal. More specifically the second unit is a gate having inputs receiving the branch inhibiting signal and the branch address load signal, respectively. An output of the gate is connected to a load control input of the program counter.

With this arrangement, if the test mode signal is applied to the first unit, even if the branch instruction is read out from the read only memory and the branch address load signal is generated, the branch address of the read only memory is not loaded to the program counter. Thus, all of the programs in the read only memory, excluding a branch instruction or instructions, are sequentially executed in the order of addresses. Therefore, by comparing the output of the microcomputer with a predetermined data, it can be determined as to whether or not the microcomputer having the internal read only memory stored with the user's program can properly operate.

The above and other objects, features and advantages of the present invention will be apparent from the following description of the preferred embodiment of the invention with reference to the accompanying drawings.

DESCRIPTION OF THE PREFERRED EMBODIMENT

Figure 1:
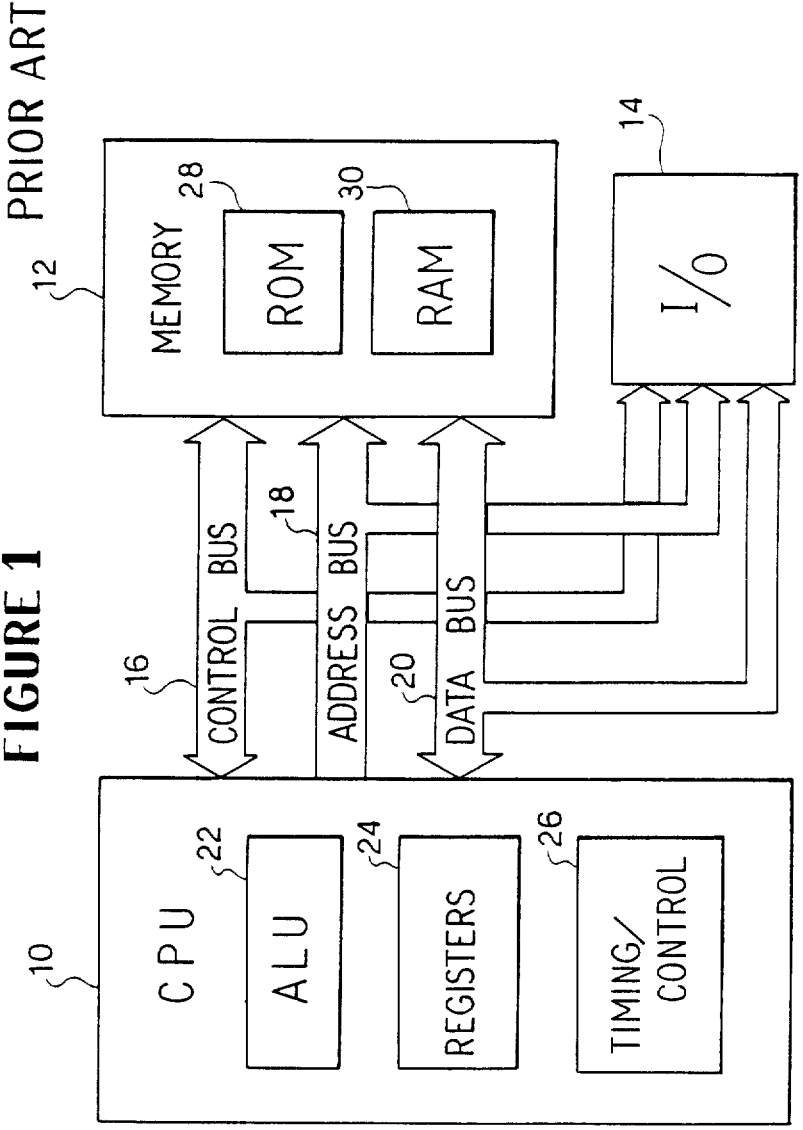
FIG. 1 is a block diagram showing the basic construction of a conventional microcomputer.

Referring to FIG. 1, there is shown the basic construction of a conventional microcomputer, which includes a central processing unit (CPU) 10, an internal memory 12 and an input/output (I/O) port 14 which are coupled to one another through an internal bus divided into a control bus 16, an address bus 18 and a data bus 20. The CPU 10 is mainly constructed by an arithmetic and logic unit (ALU) 22, a register group 24 including accumulator, a temporary register, a status register, etc., and a timing and control circuit 26. On the other hand, the internal memory includes a ROM 28 for storing microprograms, and a random access memory (RAM) 30. The microcomputer has been described very briefly on its construction, but since the construction and operation of the microcomputer are well known, further explanation will be omitted.

Figure 2:
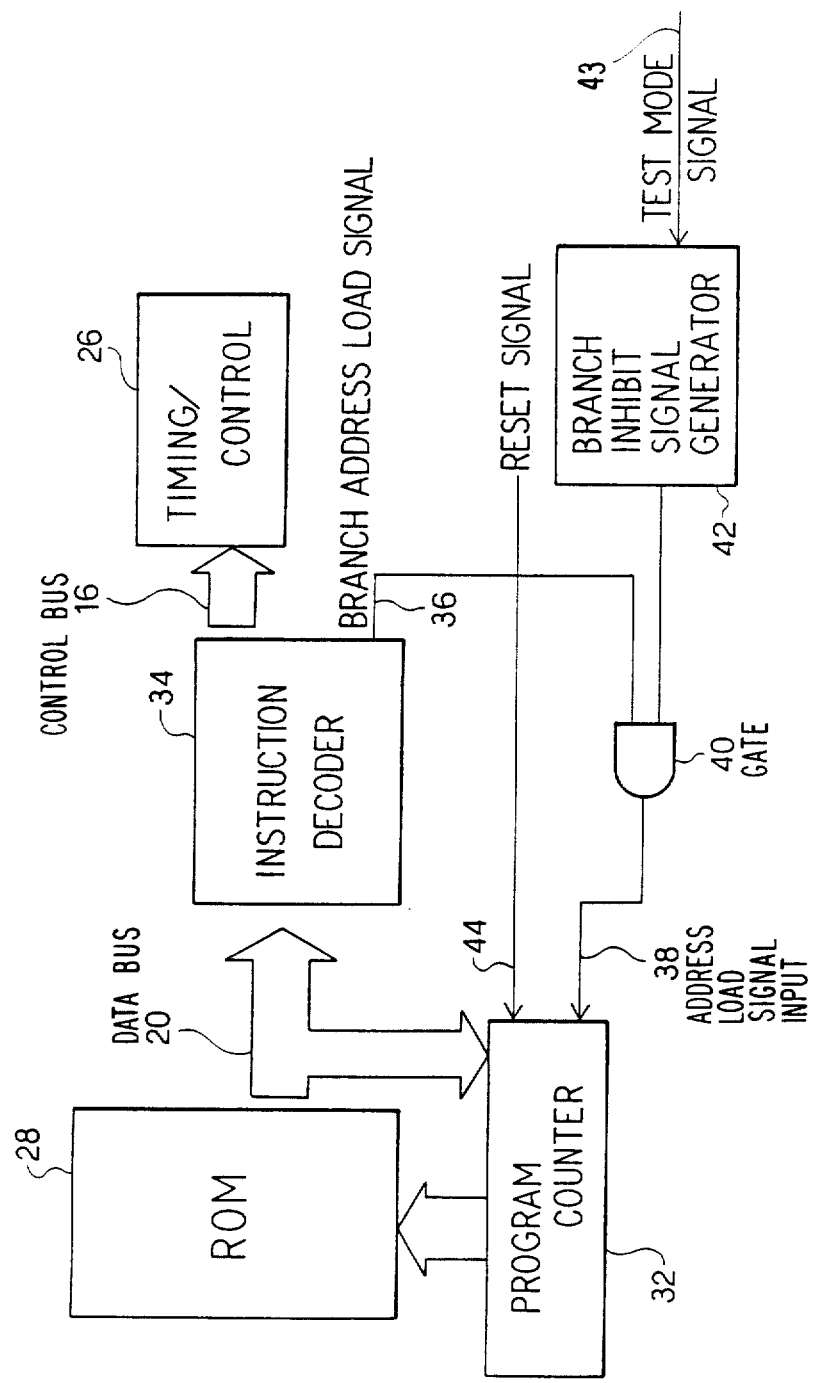
FIG. 2 is a block diagram of an essential portion of one embodiment of the microcomputer in accordance with the present invention.

Turning to FIG. 2, there is shown an essential portion of the microcomputer embodying the present invention. The ROM 28 is controlled by a program counter 32, so that the program stored at a memory location designated by the program counter 32 is read out and outputted through the data bus 20 to an instruction decoder 34. The program counter 32 is adapted to be normally incremented at each read-out of the ROM 28 but to be loaded with the output (i.e., a branch address) of the ROM 28 in response to a branch address load signal 36 from the instruction decoder 34. This decoder 34 supplies a decoded control instruction to the timing-/control circuit 26. In addition, when a branch instruction is read out from the ROM 28, the instruction decoder 34 generates the above mentioned branch address load signal 36 which should be fed to an address load signal input 38 of the program counter 32 in the conventional microcomputer, so that the branch address outputted from the ROM 28 is loaded to the program counter 32 to permit branch or jump of program execution. In the shown embodiment, however, the branch address load signal output 36 of the decoder 34 is connected to one input of an AND gate 40. On the other hand, a branch inhibit signal generator 42 is provided to receive a test mode signal 43 which signal of for example a low logical level in response to the test mode signal. Otherwise, the generator 42 supplies a signal of high logical level to the AND gate 40. An output of the AND gate 40 is connected to the address load signal input 38 of the program counter.

In the test of the microcomputer, when the function test is performed on the programs stored in the ROM 28, the test mode signal is supplied to the branch inhibit signal generator 42 so that the generator 42 produces the branch inhibiting signal to the AND gate 40. Further, a reset signal is supplied to a reset input 44 of the program counter 32 to set it to a "zero" address. Thereafter, the program counter 32 is sequentially incremented from the "zero" address. At each increment of the program counter, the instruction stored at the memory location designated by the program counter 32 is read out from the ROM 28 and decoded by the instruction decoder 34. In response to the decoded instruction, the timing/control circuit 26 controls various portions of the microcomputer so that the computer executes the instructions read out from the ROM 28.

In the course of the operation of the microcomputer, if a branch or jump instruction is outputted to the decoder 34, the decoder 34 generates the branch address load signal 36. But, since the generator 42 produces the low level branch inhibiting signal to the AND gate 40, the address load signal is blocked by the AND gate 40 from being inputted to the address load signal input 38 of the program counter 32. Otherwise, the address load signal would be inputted to the counter 32 so that the branch address or the destination address to be jumped to would be loaded to the counter 32. Thus, even if the user's program includes loop programs, the loop programs are ignored and the instruction sequences stored in the ROM 28 excluding the branch instructions are sequentially executed in the order of addresses from the "zero" address to the last address.

The data outputted from the I/O port 14 of the microcomputer in the course of the ROM program execution is compared with an expected data which is beforehand prepared on the basis of the user's program.

In the microcomputer mentioned above and in accordance with the manner also mentioned above, the function of the microcomputer is examined and confirmed at each instruction sequence of the user's programs. In the above mentioned test, however, there cannot be an examination as to whether or not a combination of each branch instruction and the destination address to be moved by that branch instruction is proper. But, this can be confirmed by performing a test of the combination of a branch instruction and another instruction in the conventional function test.

In a normal operation of the microcomputer, since the test mode signal is not supplied to the generator 42, the generator 42 outputs a high level signal to the AND gate 40, and therefore, the branch address load signal 36 will be inputted through the AND gate 40 to the address load signal input 38 of the counter 32, so that the destination or branch address outputted from the ROM 28 is loaded to the counter 32.

In any case, when the test mode signal is applied, it is sufficient if the program counter is prevented from being loaded with the branch address even if the branch instruction is generated or read out. Therefore, if this feature is fulfilled, it is not limited to only the construction of FIG. 2, and a variety of circuit constructions can be used.

As can be seen from the above, in the microcomputer in accordance with the present invention, the function test based on the instructions in the ROM for storing the user's program can be performed with addition of a very simple circuit. With this test, it is possible to decrease the numbers of defective microcomputers delivered to users or put in the market.

The invention has thus been shown and described with reference to specific embodiments. However, it should be noted that the invention is in no way limited to the details of the illustrated structures but changes and modifications may be made within the scope of the appended claims.

We claim:

1. A microcomptuer having
   a memory for storing a user's program,
   a program counter coupled to the memory for designating an address of a memory location to be read out from the memory, the program counter being coupled to receive a branch designation address from the memory when a branch instruction is read out from the memory, and
   means for preventing the program counter from receiving a branch destination address from the memory when the microprocessor is in a test mode for the user's program, so as to inhibit the execution of a branch operation in accordance with the branch instruction read out from the memory, so that the instructions stored in the memory are sequentially executed one by one in the order of addresses.

2. A microcomputer as claimed in claim 1 wherein the means for preventing includes first means for detecting a branch instruction from the output of the memory, and second means receiving a test mode signal and for controlling the program counter to prevent the program counter from being written with a branch address.

3. A microcomputer as claimed in claim 2 wherein the first means is an instruction decoder for decoding instructions read out of the memory.

4. A microcomputer as claimed in claim 1 wherein an instruction decoder is coupled to the memory for decoding the instructions read out from the memory and generating a branch address load signal to the program counter when the read-out instruction requires a branch operation, and wherein the program counter is ordinarily incremented at each read-out of the memory and loaded with a branch address by the branch address load signal of the instruction decoder, and wherein the means for preventing includes first means, in response to a test mode signal, for generating a branch inhibiting signal, and second means, in response to the branch inhibiting signal, to prevent the branch address load signal from being written to the program counter.

5. A microcomputer as claimed in claim 4 wherein the first means includes a branch inhibiting signal generator for receiving a test mode signal and generating the branch inhibiting signal, and wherein the second means includes a gate having inputs for receiving the branch inhibiting signal and the branch address load signal, respectively, an output of the gate being connected to the program counter so that when the branch inhibiting signal is generated the branch address load signal is not inputted to the program counter.

6. A microcomputer which includes
a central processing unit,
memory means having at least a read only memory for storing a user's program,
a program counter coupled to the read only memory for designating the address of a read only memory location to be read out from the memory, the program counter being coupled to receive a branch designation address from the read only memory when a branch instruction is read out from read only the memory,
an input/output port, and
means for preventing the program counter from receiving a branch destination address from the read only memory when the microprocessor is in a test mode for the user's program, so as to inhibit the execution of a branch operation in accordance with the branch instruction read out from the memory, so that all the instructions stored in the read only memory excluding a branch instruction or instructions are sequentially executed one by one in the order of addresses by the central processing unit and the result of the sequential execution is outputted from the input/output port or an output port.

7. A microcomputer as claimed in claim 6 wherein the means for preventing includes first means for detecting a branch instruction from a branch address of the read only memory, and second means for receiving a test mode signal and for controlling the program counter to prevent the program counter from being written with the output of the read only memory.

8. A microcomputer as claimed in claim 7 wherein the first means includes an instruction decoder receiving the output of the read only memory for decoding the instructions read out from the read only memory and generating a branch address load signal to the program counter when the read-out instruction requires a branch operation.

9. A microcomputer as claimed in claim 6 wherein an instruction decoder is coupled to the read only memory for decoding the instructions read out from the read only memory and generating a branch address load signal to the program counter when the read-out instruction requires a branch operation, and wherein the program counter is ordinarily incremented at each read-out of the read only memory and loaded with a branch address of the read only memory by the branch address load signal from the instruction decoder, and wherein the means for preventing includes first means, in response to a test mode signal, for generating a branch inhibiting signal, and second means, in response to the branch inhibiting signal, to prevent the branch address load signal from being written to the program counter.

10. A microcomputer as claimed in claim 9 wherein the first means includes a branch inhibiting signal generator receiving a test mode signal and generating the branch inhibiting signal and the second means includes a gate having inputs for receiving the branch inhibiting signal and the branch address load signal, respectively, an output of the gate being connected to the program counter so that when the branch inhibiting signal is generated the branch address load signal is not inputted to the program counter.

* * * * *